United States Patent
Xu et al.

(10) Patent No.: US 12,111,779 B2
(45) Date of Patent: Oct. 8, 2024

(54) NODE IDENTIFICATION ALLOCATION IN A MULTI-TILE SYSTEM WITH MULTIPLE DERIVATIVES

(71) Applicant: Mellanox Technologies, Ltd., Yokneam (IL)

(72) Inventors: Rui Xu, Marlborough, MA (US); Mark Rosenbluth, Uxbridge, MA (US); Diane Orf, Natick, MA (US); Michael Cotsford, Medway, MA (US); Shreya Tekade, Framingham, MA (US)

(73) Assignee: Mellanox Technologies, Ltd., Yokneam (IL)

( * ) Notice: Subject to any disclaimer, the term of this patent is extended or adjusted under 35 U.S.C. 154(b) by 75 days.

(21) Appl. No.: 17/958,229

(22) Filed: Sep. 30, 2022

(65) Prior Publication Data

US 2024/0111694 A1  Apr. 4, 2024

(51) Int. Cl.
*G06F 13/16* (2006.01)
*G06F 13/42* (2006.01)

(52) U.S. Cl.
CPC ...... *G06F 13/1668* (2013.01); *G06F 13/4221* (2013.01); *G06F 2213/0026* (2013.01)

(58) Field of Classification Search
CPC .......................... G06F 13/1668; G06F 13/4221
See application file for complete search history.

(56) References Cited

U.S. PATENT DOCUMENTS

| | | | |
|---|---|---|---|
| 2005/0044195 A1* | 2/2005 | Westfall | H04L 49/101 709/223 |
| 2010/0111088 A1* | 5/2010 | Olofsson | H04L 45/06 370/392 |
| 2013/0332635 A1* | 12/2013 | Bolton | H04M 1/72412 710/105 |
| 2014/0052923 A1* | 2/2014 | Ikeda | G06F 12/0817 711/130 |
| 2016/0127207 A1* | 5/2016 | Zaccaria | G05B 19/0428 709/224 |
| 2017/0111157 A1* | 4/2017 | Nagrath | H04L 69/28 |
| 2018/0165245 A1* | 6/2018 | Ihara | G06F 11/1423 |
| 2020/0192717 A1* | 6/2020 | Kasagi | G06F 9/5027 |

* cited by examiner

*Primary Examiner* — Phong H Dang
(74) *Attorney, Agent, or Firm* — Lowenstein Sandler LLP (57) ABSTRACT

A system including an array of functional units connected via a two-dimensional mesh network is described. A first functional unit in the array of function units includes a memory device and a processing device, operatively coupled with the memory device, to perform operations including generating a node identifier identifying a second functional unit in the array of functional units, and transmitting, over the two-dimensional mesh network, the node identifier identifying the second functional unit in the array of functional units. The node identifier may include a mesh interface component and a port identifier, and one or more information elements selected from the group consisting of a payload, a target node identifier, a target type identifier, an information type identifier, a linear identifier, and a protocol identifier.

24 Claims, 6 Drawing Sheets

500 generating, by a first functional unit in an array of functional units connected via a two-dimensional mesh network, a node identifier identifying a second functional unit in the array of functional units
510 transmitting, over the two-dimensional mesh network, the node identifier identifying the second functional unit in the array of functional units, wherein the node identifier comprises a first coordinate identifier and a second coordinate identifier identifying a location of the second functional unit in the array of functional units
520 storing, in a memory of the first functional unit, product information and revision information associated with a data structure, wherein the data structure comprises computer executable instructions to program the second functional unit based on a target type identifier of the second functional unit
530 receiving, by one or more PTAs in the first functional unit, configuration information to configure the one or more PTAs, wherein the configuration information further comprises traffic information to direct one or more messages
540 transmitting, by the first functional unit, the node identifier and the one or more messages to the second functional unit over the two-dimensional mesh network
550

NODE IDENTIFICATION ALLOCATION IN A MULTI-TILE SYSTEM WITH MULTIPLE DERIVATIVES

TECHNICAL FIELD

Embodiments of the disclosure relate generally to processors, and more specifically, relate to a system for communicating between two or more devices in a processor.

BACKGROUND

Commercial graphics processing unit (GPU) computation systems commonly configure a cluster of multiple GPU devices to operate in concert, for example, to solve a single problem. In such systems, each GPU device typically executes instructions to solve a portion of the problem and communicates intermediate results with other GPU devices as execution progresses. A local memory may be coupled to each GPU device for local program and data storage. Each local memory is conventionally accessed via an independent, local address space associated with the corresponding GPU. Each GPU may comprise multiple processing cores, and each core commonly implements a cache for efficient access to data that is relevant to an ongoing computation. Each local memory and each cache associated with a given GPU is conventionally configured to be exclusively accessed by the GPU. Each GPU may be configured to access a common system memory for communicating with a host central processing unit (CPU). The CPU may transmit data to the GPU via the system memory and receive data from the GPU via the system memory. However, identification of the GPU (or node) is carried out using hard macros, and therefore identification of these units or nodes cannot be changed for new products.

In a conventional cluster of multiple GPU devices, one GPU transmits data, such as intermediate results, to another GPU using a technique involving at least two copy operations and a temporary buffer in system memory. While technically feasible, this technique makes inefficient use of system resources such as bandwidth and memory. Furthermore, each transmitting GPU must execute programming instructions to bundle and transmit outbound data, and each receiving GPU must execute programming instructions to receive and unbundle the data. The overall process makes inefficient use of GPU resources, further reducing overall system efficiency.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Advantageously, aspects of the present disclosure can address the deficiencies above and other challenges by providing a multi-tile system for identifying nodes or devices in a processor (e.g., CPU, GPU, or DPU). Aspects of the present disclosure are directed to a multi-tile system including an array of functional units (referred to as "tiles" or "cores" in this disclosure) connected via a two-dimensional mesh network (e.g., a compute subsystem (CSS) interface). A first functional unit in the array of function units includes a memory device and a processing device, operatively coupled with the memory device, to perform operations including generating a soft node identifier identifying a second functional unit in the array of functional units, and transmitting, over the two-dimensional mesh network, the node identifier identifying the second functional unit. Since every product has a different tile topology, the location of each tile must be configurable, and therefore the node identifier of every tile must be configurable as well.

In some embodiments, the node identifier may include a first coordinate identifier (e.g., x-coordinate) and a second coordinate identifier (e.g., y-coordinate) to identify a location of the second functional unit in the array of functional units. The array of functional units may include one or more of a processor, a memory controller, a graphics processor, a last level cache tile, a public key accelerator, a regular expression tile, a management gateway, a peripheral component interconnect express (PCIE) request node, and a memory subsystem. In one embodiment, the node identifier may include a mesh interface component and a port identifier. The node identifier may also include information elements such as a payload, a target node identifier, a target type identifier, an information type identifier, a linear identifier, and a protocol identifier. In some embodiments, the first functional unit may store, in its memory device, product information (e.g., product identification) and revision information (e.g., revision identification) associated with a data structure. The data structure may include computer-executable instructions to program the second functional unit based on a target type identifier of the second functional unit.

Figure 1:
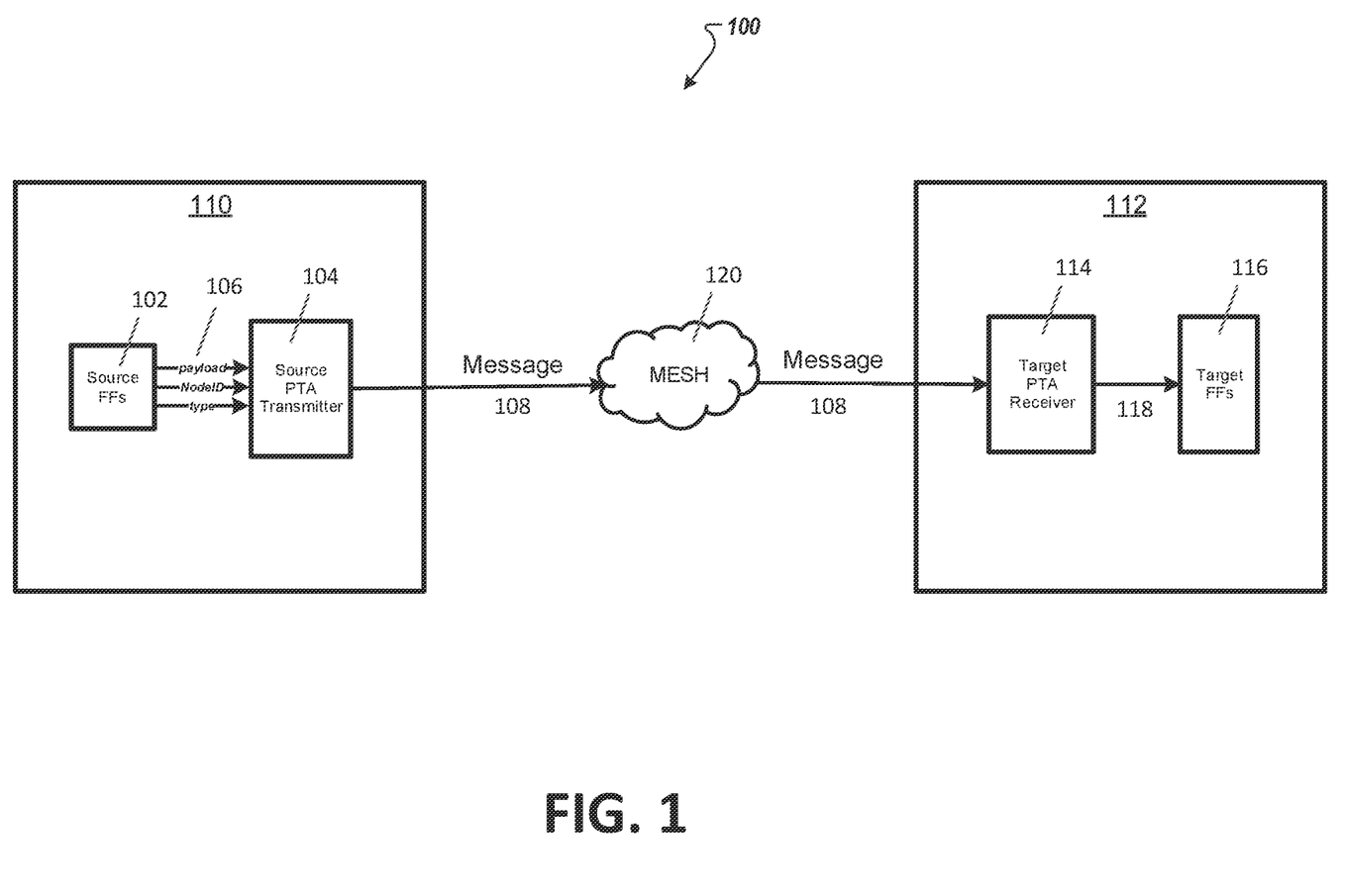
FIG. 1 illustrates an example multi-tile system in accordance with some embodiments of the present disclosure.

FIG. 1 illustrates a multi-tile system 100 including a source device 110 and a target device 112, in accordance with some embodiments of the present disclosure. Source device 110 and target device 112 may include one or more processors, memory controllers, graphics processors, last level cache tiles, public key accelerators, regular expression tiles, management gateways, peripheral component interconnect express (PCIE) request nodes, and memory subsystems. Source device 110 may be connected to target device 112 via a mesh network 120. The mesh network 120 may include a mesh interface that connects the source device 110 and the target device 112. In some embodiments, the mesh interface may be a two-dimensional compute subsystem (CSS) interface or an enhanced serial peripheral interface (eSPI), for example.

Source device 110 may include a plurality of virtual wire source flip-flops 102 that transmit information 106 to a virtual wire protocol translation adapter (PTA) transmitter 104. Information 106 may include information elements such as a payload, a target node identifier (NodeID), an information type identifier, a source identifier, a protocol identifier, or a combination thereof. The transmitter 104 encloses a message 108 in a set of codes to allow the transfer of the message or signal across the mesh interface 120. For example, when the signal level at a source flip-flops 102 changes, the PTA transmitter 104 sends a message 108 to the target device 112 with the new value. The message payload can be multiple bits, so a single message can indicate changes to multiple signals. The message can be used at the target device to update the state of the signals in the source flip-flop circuit or latch element.

The multi-tile system 100 may include a target device 112, which may include one or more processors, memory controllers, graphics processors, last level cache tiles, public key accelerators, regular expression tiles, management gateways, peripheral component interconnect express (PCIE) request nodes, and memory subsystems. The target device 112 may include a virtual wire PTA receiver 114 configured to receive the mesh message 108, decode at least a payload 118 from the single virtual wire message 108, and transmit at least the payload 118 to one or more virtual wire target flip-flops 116. In some embodiments, the virtual wire PTA receiver 114 may decode the information 106 in its entirety, including the payload, target node identifier, and type identifier.

Figure 2:
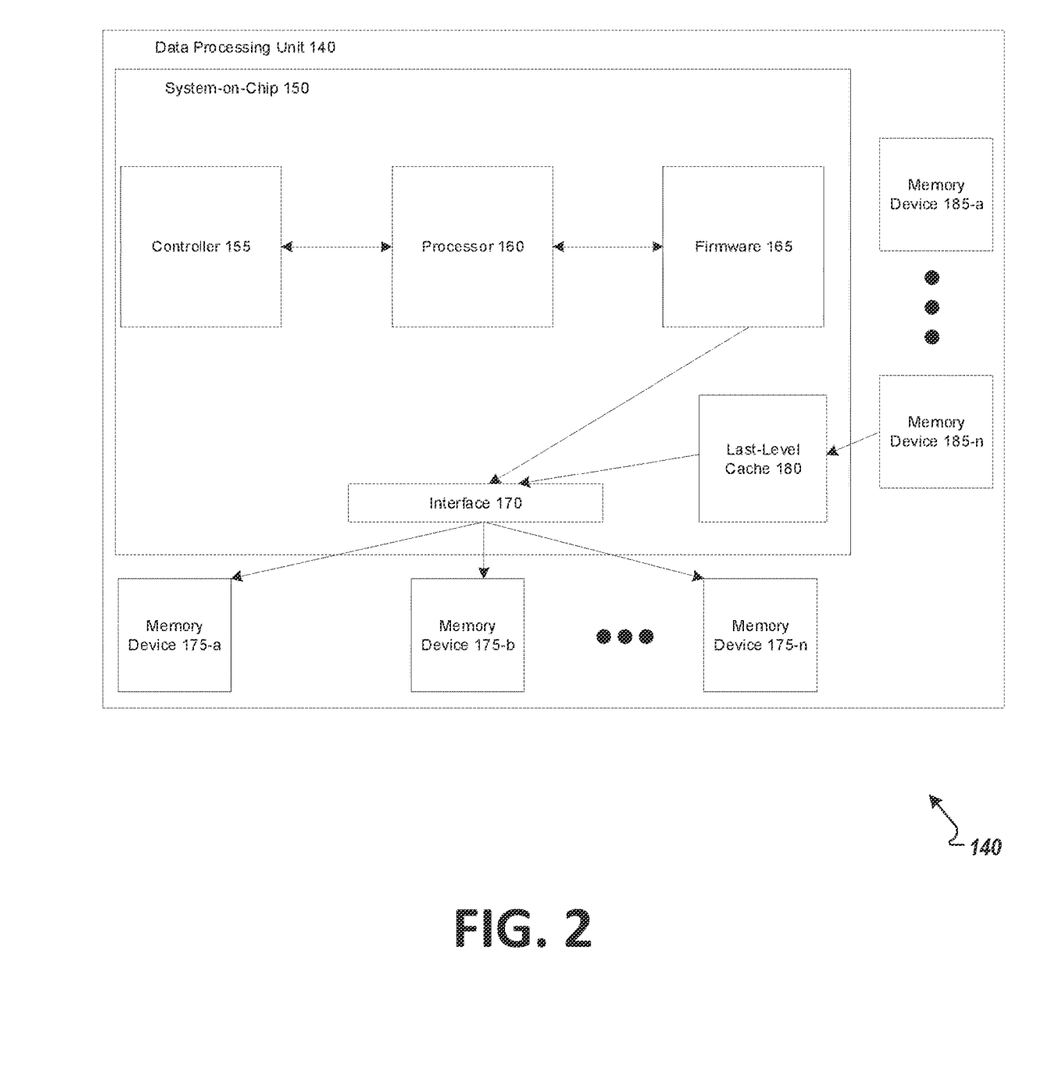
FIG. 2 is an example data processing unit in accordance with at least some embodiments.

FIG. 2 illustrates an example DPU 140 that may include a multi-tile system as described in FIG. 1. In at least one embodiment, DPU 140 can be an example of a network interface controller (NIC). In at least one embodiment, DPU 140 can be an example of an NVIDIA® BlueField® DPU. As illustrated in FIG. 2, in some embodiments, the DPU 140 can include a system-on-chip (SOC) 150, memory devices 175, and memory devices 185. In at least one embodiment, the DPU 140 support directly reading or writing to attached local peripheral memory devices 175 (e.g., NVM express (NVMe) drives or other storage devices) via a storage subsystem in response to remote initiator requests (e.g., content transfer requests received from devices over a network to which the data communication device is connected). In at least one embodiment, the DPU 140 can include memory devices 185 (e.g., a random-access memory (RAM) (e.g., Double Data Rate (DDR) memory)) which are used to transfer content between the data communication device and the memory devices 175, and vice-versa. In some embodiments, the SOC 150 can further include a controller 155 and firmware 165. In some embodiments, the SOC 150 can include one or more processors 160 (e.g., a single or multi-core central processing unit (CPU)) to facilitate processing data. In such embodiments, the multi-core CPU arm architecture can couple the controller 155 with the firmware 165. In at least one embodiment, the SOC 150 can include a last level cache (LLC) 180 shared by the controller 155 and firmware 165. In at least one example, the controller 155 is an example of a network interface controller coupling the DPU 140 to the user device 105 or a computer network (e.g., cloud network).

Figure 3:
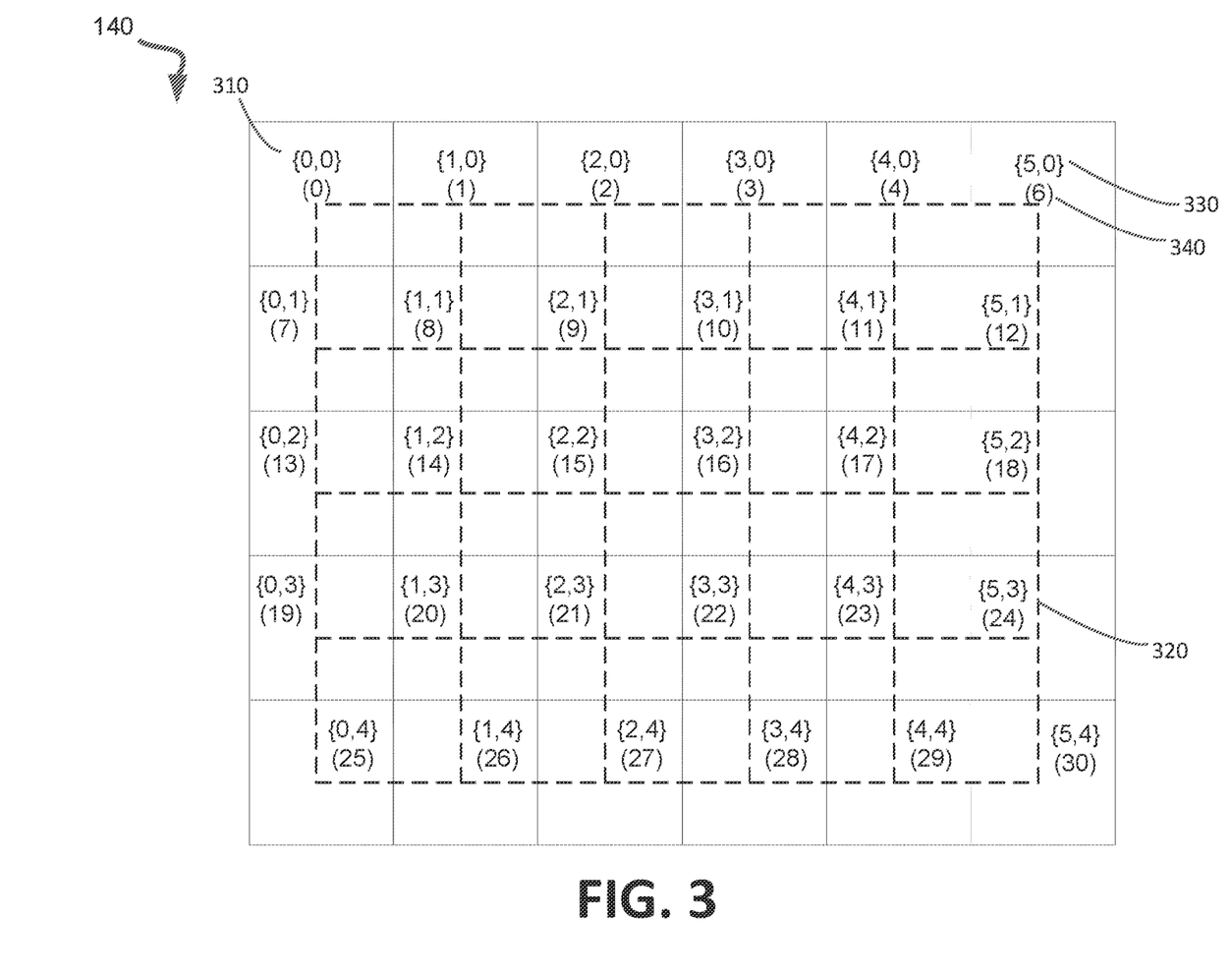
FIG. 3 illustrates a topology of an example multi-tile system in accordance with some embodiments of the present disclosure.

FIG. 3 illustrates a topology of an example multi-tile system in accordance with some embodiments of the present disclosure. DPU 140 has an array of functional units 310 (e.g., processors 160) connected by a mesh network 320. Each of the functional units 310 may include one or more processors, memory controllers, graphics processors, last level cache tiles, public key accelerators, regular expression tiles, management gateways, peripheral component interconnect express (PCIE) request nodes, and memory subsystems. The mesh network 320 may include a mesh interface that connects each of the functional units 310. In some embodiments, the mesh interface may be a two-dimensional compute subsystem (CSS) interface or an Enhanced Serial Peripheral Interface (eSPI), for example.

In some embodiments, all tiles 310 have a node identification (NodeID), which is used in sending and receiving messages. The encoding of the NodeID may be defined to simplify the routing of messages through the mesh network. The NodeID width may be defined based on CHI specification. For example, a NodeID can be any number of bits, for example, ten or more bits. In some embodiments, all tiles (e.g., functional units 310) have a unique {x, y} coordinate 330, which may be converted into a NodeID. The x-coordinate for the tile array may start at 0 (zero) for the west most column and increase in increments of 1 as the tiles move to the east most row. Similarly, the y-coordinate may start at 0 for the northmost row and increase in increments of 1 as the tiles move to the southmost row. An example format for a NodeID is provided below, which includes four bits for the x-coordinate, four bits for the y-coordinate, two bits for the port identifier, and one bit for the mesh interface block identifier:

| 10 | 9 | 8 | 7 | 6 | 5 | 4 | 3 | 2 | 1 | 0 |
|---|---|---|---|---|---|---|---|---|---|---|
| MIB | | Port | | x coordinate | | | | y coordinate | | |

In one embodiment, routing messages between nodes may be based on the {x, y} coordinate of the source and target devices. For example, {x, y} coordinate may be used for calculating the route through the mesh network from a source device to a target device. For example, if target X is larger than the source X, the message would move east through the mesh network. In some embodiments, the NodeID may also include a linear identifier 340 individually identifying each of the tiles 310.

Figure 4:
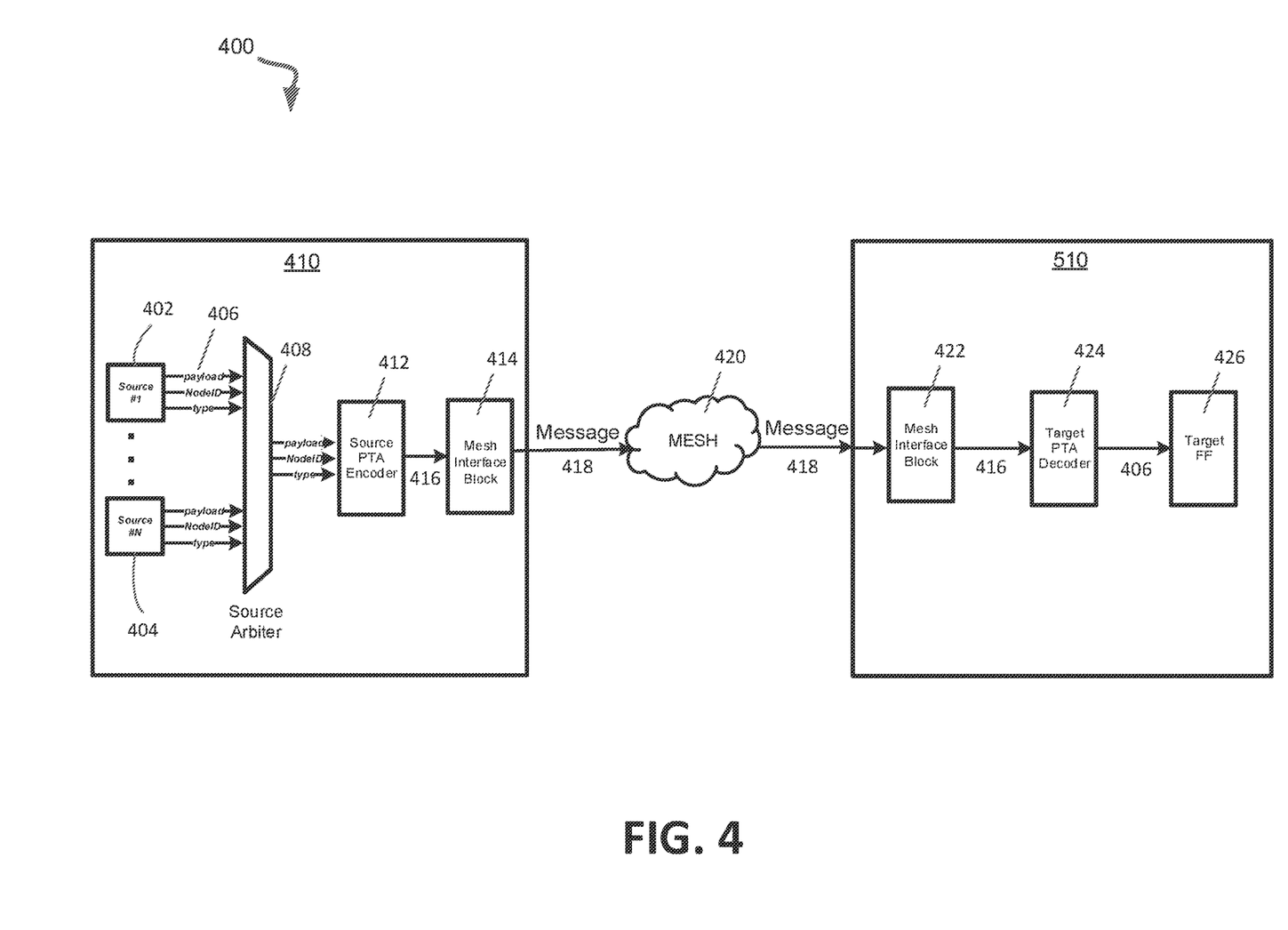
FIG. 4 illustrates a multi-tile system in accordance with some embodiments of the present disclosure.

FIG. 4 illustrates a multi-tile system 400 including a source device 410 and target 510, in accordance with some embodiments of the present disclosure. Source device 410 and target 510 may include one or more processors, memory controllers, graphics processors, last level cache tiles, public key accelerators, regular expression tiles, management gateways, peripheral component interconnect express (PCIE) request nodes, and memory subsystems. Source device 410 may be connected to target device 510 via a mesh network 420. The mesh network 420 may include a mesh interface that connects the source device 410 and the target device 510. In some embodiments, the mesh interface may be a two-dimensional compute subsystem (CSS) interface or an Enhanced Serial Peripheral Interface (eSPI), for example.

At startup, all memory mapped input/output (MMIO) accesses are directed to the RSHIM (e.g. a Generic Interrupt Controller (GIC)) so software can retain critical information to program the chip. Product identification and revision identification registers in the RSHIM can help software identify the chip and load the appropriate data structures within the boot ROM. The topology table may include information such as the X and Y coordinates of the tile and the tile name (e.g., identifying the type of functional unit). Once the product information is read from the boot ROM, software can perform the necessary steps to configure the chip. This can be done through data structures which define how to program a specific cluster based on the type of the device, e.g. last level cache tile, public key accelerator, regular expression tile, management gateway, peripheral component interconnect express (PCIE) request node, etc.

For example, an APT (e.g., a DynamIQ Shared Unit (DSU)) has a specific set of registers which must be programmed with values specific to that APT instance, but each APT instance has the same set of registers to be programmed. Accordingly, the source device 410 may store (e.g., in a memory device) a table including the X and Y coordinates of the tiles and the tile names (e.g., identifying the type of functional unit) for a specific product. When a product with a topology different from the current topology is loaded, the source device may identify that the topology is different, and configure the table (including the node identifiers) according to the new topology. Since every product has a different tile topology, using the current methodology the location of each tile is configurable, and therefore the node identifier of every tile can also be configured.

Source device 410 may include a plurality of virtual wire sources 402-404. In one embodiment, the plurality of virtual wire sources 402-404 may include data registers (e.g., a flip-flop circuit or a latch element) for storing a level change. Source device 410 may also include a virtual wire arbiter 408 that receives information 406 from the virtual wire sources 402-404 and selects information 406 from the virtual wire sources 402-404 to be transmitted to a virtual wire protocol translation adapter (PTA) encoder 412. The selection may be based on a predefined condition. For example, the virtual wire arbiter 408 may only select signals that indicate a change in a signal level at the source 402. Information 406 may include information elements such as a payload, a target node identifier (NodeID), an information type identifier, a source identifier, a protocol identifier, or a combination thereof. The encoder 412 encloses a message or signal in a set of codes to allow the transfer of the message or signal across the mesh interface 420. For example, when the signal level at a source 402 changes, the encapsulator or encoder 412 arbitrates for the SkyMesh® coherent on-chip interconnect channel, and then sends a message to the target device with the new value. The message payload can be multiple bits, so a single message can indicate changes to multiple signals. The message can be used at the target device to update the state of the signals in the source flip-flop circuit or latch element. In some embodiments, virtual wire messages can be sent without any flow control because they only update the state of the source device's signals at the target device. Therefore, a new message can always be accepted by the target device. Although NodeID and information type are provided as input examples in this embodiment, these information elements may not be needed by a target device. In some embodiments, the virtual wire encoder 412 may be used to capture any number of changes to a bunch of wires and generate flits (messages) to the SkyMesh channel, and it can support virtual wire messages up to 80 bits wide or more.

The virtual wire encoder 412 is configured to receive information 406 from the virtual wire arbiter 408, combine the information 406 into a single virtual wire message 416, and transmit the single virtual wire message 416 to a mesh interface component 414 in the source device 410. The mesh interface component 414, which may include a buffer, for example, is further configured to receive the single virtual wire message 416, generate a mesh message 418 including the single virtual wire message 416, and transmit the mesh message 418 over a physical link of the mesh interface 420.

The multi-tile system 400 may include a target device 510, which may include one or more processors, memory controllers, graphics processors, last level cache tiles, public key accelerators, regular expression tiles, management gateways, peripheral component interconnect express (PCIE) request nodes, and memory subsystems. The target device 510 may include a mesh interface component 422 (e.g., a buffer) configured to receive the mesh message 418, decode the single virtual wire message 416 from the mesh message 418, and transmit the single virtual wire message 416 to a virtual wire PTA decoder 424. The virtual wire PTA decoder 424 may be configured to receive the single virtual wire message 416, decode at least a payload from the single virtual wire message 416, and transmit at least the payload to a virtual wire target 426 (e.g., a flip flop circuit or a latch element) in the target device 510. In some embodiments, the virtual wire PTA encoder 424 may decode the information 406 in its entirety, including the payload, target node identifier, and type identifier. In some embodiments, the source device 410 and the target device 510 may also include protocol translation adapters (PTAs), and may include operations including receiving, by the one or more PTAs, configuration information to configure the one or more PTAs. The configuration information may further include traffic information to direct one or more messages and transmit the node identifier and the one or more messages to the target device 510 over the two-dimensional mesh network 420.

In some embodiments, the multi-tile system may be used to send an interrupt from a source processor core to a Generic Interrupt Controller (GIC). A GIC takes interrupts from peripherals, prioritizes them according to a predefined condition, and delivers them to the appropriate target processor core. In another example, the multi-tile system may be used for multicasting CoreSight® security level information from a configuration register in Rshim to one or more processor cores. For example, when the signal level at the source device changes, the encapsulator arbitrates for the SkyMesh® coherent on-chip interconnect channels and then sends a message to the target device with the new value. The message payload can be multiple bits, so a single message can indicate changes to multiple signals. The message can be used at the target to update the state of the signals in the flip-flop circuit or latch element. In some embodiments, virtual wire messages can be sent without any flow control because they only update the state of the source device's signals at the target device. Therefore, a new message can always be accepted by the target device.

As described above, the virtual wire encapsulator arbitrates for the use of SkyMesh® channels, which means that if a signal changes state, and then changes state again before the message is sent, then both transitions may be lost at the target because the target can see no transition; just a constant value. Therefore, a virtual wire tunnel may be used only for signals that are not sensitive to this loss of information.

Figure 5:
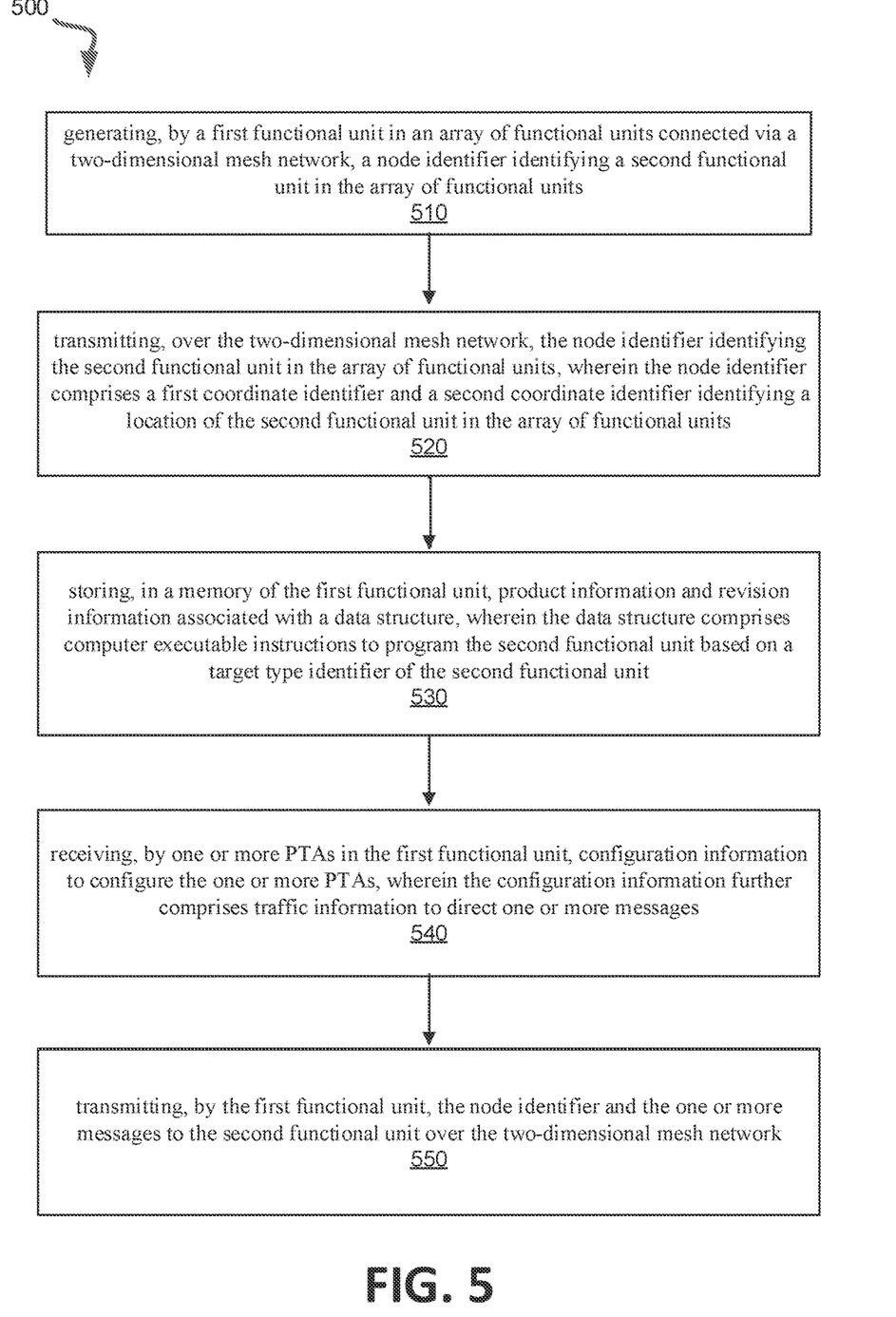
FIG. 5 illustrates example operations in a method for node identification allocation in accordance with some embodiments of the present disclosure.

FIG. 5 illustrates example operations in a method 500 for node identification in a multi-tile system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Aspects of the present disclosure can be applied to a multi-tile system including an array of functional units (referred to as "tiles" or "cores") connected via a two-dimensional mesh network (e.g., a compute subsystem (CSS) interface). A first functional unit (e.g., source device 410) in the array of function units includes a memory device and a processing device, operatively coupled with the memory device, to perform a series of operations. At operation 510, the first functional unit generates a soft node identifier identifying a second functional unit in the array of functional units. In this operation, the software residing on the functional units can determine a derivative by reading product information (e.g., product identification) and revision information (e.g., revision identification) from the registers, and new values are loaded through electronic fuses, for every derivative of the chip. Once the software residing on the functional unit knows which derivative it is running on, it can derive the tile array topology from a table in the read-only memory (ROM). Based on the topology, the software residing on the functional unit can load configuration registers, providing hardware components with the actual node identification of all the tiles. Therefore, the node identifiers can be reused at the physical level of the chip.

At operation 520, the first functional unit transmits the node identifier identifying the second functional unit over the two-dimensional mesh network (e.g., mesh network 420). Since every product has a different tile topology, the location of each tile must be configurable, and therefore the node identifier of every tile must be configurable as well. In some embodiments, the node identifier may include a first coordinate identifier (e.g., x-coordinate) and a second coordinate identifier (e.g., y-coordinate) to identify a location of the second functional unit in the array of functional units. For example, the x-coordinate may be included in four bits of the node identifier, and the y-coordinate may be included in another four bits of the node identifier. An example format for a node identifier is provided below, which includes four bits for the x-coordinate, four bits for the y-coordinate, two bits for the port identifier, and one bit for the mesh interface block identifier:

| 10 | 9 | 8 | 7 | 6 | 5 | 4 | 3 | 2 | 1 | 0 |
|---|---|---|---|---|---|---|---|---|---|---|
| MIB | Port | | x coordinate | | | | y coordinate | | | |

The array of functional units may include one or more of a processor, a memory controller, a graphics processor, a last level cache tile, a public key accelerator, a regular expression tile, a management gateway, a peripheral component interconnect express (PCIE) request node, and a memory subsystem. In some embodiments, the node identifier may include a mesh interface component and a port identifier. For example, the mesh interface block information may be included in one bit, and the port identification may be included in two bits of the node identifier. The node identifier may also include information elements such as a payload, a target node identifier, a target type identifier, an information type identifier, a linear identifier, and a protocol identifier. A payload may include contents of a message (flit), which may be individually defined for each protocol. The payload, however, may not be used at intermediate points in the route from a source device to the target device. A target node identifier may be used to route information from a source device to a target device. Similarly, a target type identifier may be used to identify the type of functional unit that is contained in the target device. A protocol identifier may be used to determine the protocol included in the payload of the message (flit).

At operation 530, the first functional unit may store, in its memory device, product information (e.g., product identification) and revision information (e.g., revision identification) associated with the data structure. The data structure may include computer-executable instructions to program the second functional unit based on a target type identifier of the second functional unit.

At operation 540, the first functional unit (e.g., source device 410) may include one or more protocol translation adapters (PTAs) that may receive configuration information to configure the PTAs. The configuration information may also include traffic information to direct one or more messages. At operation 550, based on the configuration information, the first functional unit may transmit the node identifier and one or more messages (e.g., message 418) to the second functional unit (e.g., target device 510) over the two-dimensional mesh network (e.g., mesh network 420).

In some embodiments, all tiles have a node identification (NodeID), which is used in sending and receiving messages. The encoding of the NodeID may be defined to simplify the routing of messages through the mesh network. The NodeID width may be defined based on CHI specification. For example, a NodeID may be ten or more bits. In some embodiments, all tiles (e.g., functional units 310) have a unique {x, y} coordinate, which may be converted into a NodeID. The x-coordinate for the tile array may start at 0 (zero) for the west most column and increase in increments of 1 as the tiles move to the east most row. Similarly, the y-coordinate may start at 0 for the northmost row and increase in increments of 1 as the tiles move to the southmost row.

In one embodiment, routing messages between nodes may be based on the {x, y} coordinate of the source and target devices. For example, {x, y} coordinate may be used for calculating the route through the mesh network from a source device to a target device. For example, if target X is larger than the source X, the message would move east through the mesh network. At startup, all memory mapped input/output (MMIO) accesses are directed to the RSHIM (e.g. a Generic Interrupt Controller (GIC)) so software can retain critical information to program the chip. Product identification and revision identification registers in the RSHIM can help software identify the chip and load the appropriate data structures within the boot ROM. The topology table may include information such as the X and Y coordinates of the tile and the tile name (e.g., identifying the type of functional unit). Once the product information is read from the boot ROM, software can perform the necessary steps to configure the chip. This can be done through data structures which define how to program a specific cluster based on the type of the device, e.g. last level cache tile, public key accelerator, regular expression tile, management gateway, peripheral component interconnect express (PCIE) request node, etc. For example, an APT (e.g., a DynamIQ Shared Unit (DSU)) has a specific set of registers which must be programmed with values specific to that APT instance, but each APT instance has the same set of registers to be programmed. Accordingly, the source device 410 may store (e.g., in a memory device) a table including the X and Y coordinates of the tiles and the tile names (e.g., identifying the type of functional unit) for a specific product. When a product with a topology different from the current topology is loaded, the source device may identify that the topology is different, and configure the table (including the node identifiers) according to the new topology. Since every product has a different tile topology, using the current methodology the location of each tile is configurable, and therefore the node identifier of every tile can also be configured.

Advantages of the disclosed method include that software residing on the functional units can determine the derivative by reading product information (e.g., product identification) and revision information (e.g., revision identification) from the registers, and new values can be loaded through electronic fuses into the registers for every derivative of the chip. Once the software residing on the functional unit knows which derivative it is running on, it can derive the tile array topology from a table in the read-only memory (ROM). Based on the topology, the software residing on the functional unit can load configuration registers, providing hardware components with the actual node identification of all the tiles. Therefore, the node identifiers can be reused at the physical level of the chip.

Figure 6:
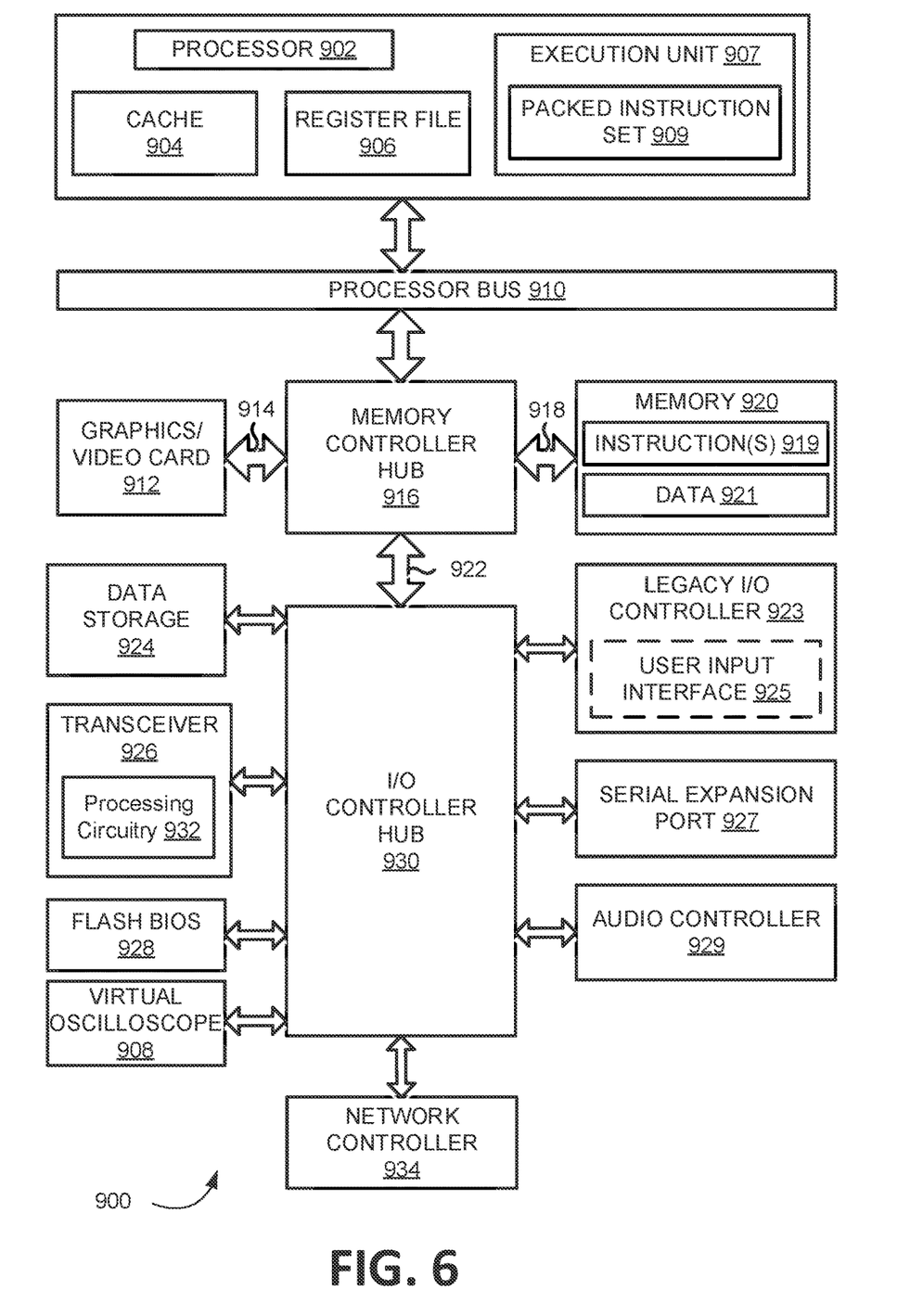
FIG. 6 illustrates an example computer system including a multi-tile system, in accordance with some embodiments of the present disclosure.

FIG. 6 illustrates a computer system 900 including a multi-tile system, in accordance with at least one embodiment. In at least one embodiment, computer system 900 may be a system with interconnected devices and components, an SOC, or some combination. In at least one embodiment, computer system 900 is formed with a processor 902 that may include execution units to execute an instruction. In at least one embodiment, computer system 900 may include, without limitation, a component, such as processor 902, to employ execution units including logic to perform algorithms for processing data. In at least one embodiment, computer system 900 may include processors, such as PENTIUM® Processor family, Xeon®, Itanium®, XScale® and/or StrongARM®, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of Windows® operating system available from Microsoft Corporation of Redmond, WA, although other operating systems (UNIX and Linux, for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 900 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 900 may include, without limitation, processor 902 that may include, without limitation, one or more execution units 907 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 900 is a single processor desktop or server system. In at least one embodiment, computer system 900 may be a multiprocessor system. In at least one embodiment, processor 902 may include, without limitation, a CISC microprocessor, a RISC microprocessor, a VLIW microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 906 may store different types of data in various registers including, without limitation, integer registers, floating point registers, status registers, and instruction pointer registers.

In at least one embodiment, execution unit 907, including, without limitation, logic to perform integer and floating point operations, also resides in processor 902. Processor 902 may also include a microcode ("ucode") read-only memory ("ROM") that stores microcode for certain macro instructions. In at least one embodiment, execution unit 909 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using the full width of a processor's data bus for performing operations on packed data, which may eliminate the need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, an SRAM device, a flash memory device, or other memory devices. Memory 920 may store instruction(s) 919 and/or data 921 represented by data signals that may be executed by processor 902.

In at least one embodiment, a system logic chip may be coupled to processor bus 910 and memory 920. In at least one embodiment, the system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and storage of graphics commands, data, and textures. In at least one embodiment, MCH 916 may direct data signals between processor 902, memory 920, and other components in computer system 900 and to bridge data signals between processor bus 910, memory 920, and a system I/O 922. In at least one embodiment, a system logic chip may provide a graphics port for coupling to a graphics controller. In at least one embodiment, MCH 916 may be coupled to memory 920 through high bandwidth memory path 918, and graphics/video card 912 may be coupled to MCH 916 through an Accelerated Graphics Port ("AGP") interconnect 914.

In at least one embodiment, computer system 900 may use system I/O 922, which is a proprietary hub interface bus to couple MCH 916 to I/O controller hub ("ICH") 930. In at least one embodiment, ICH 930 may provide direct connections to some I/O devices via a local I/O bus. In at least one embodiment, a local I/O bus may include, without limitation, a high-speed I/O bus for connecting peripherals to memory 920, a chipset, and processor 902. Examples may include, without limitation, an audio controller 929, a firmware hub ("flash BIOS") 928, a transceiver 926, a data storage 924, a legacy I/O controller 923 containing a user input interface 925 and a keyboard interface, a serial expansion port 927, such as a USB, and a network controller 934. Data storage 924 may include a hard disk drive, a floppy disk drive, a CD-ROM device, a flash memory device, or other mass storage devices. In an embodiment, the transceiver 926 includes a constrained FFE 908.

In at least one embodiment, FIG. 9 illustrates a system, which includes interconnected hardware devices or "chips" in the transceiver 926—e.g., the transceiver 926 includes a chip-to-chip interconnect including the source device 410 and target device 510 as described with reference to FIG. 4). In at least one embodiment, FIG. 9 may illustrate an exemplary SoC. In at least one embodiment, devices illustrated in FIG. 9 may be interconnected with proprietary interconnects, standardized interconnects (e.g., PCIe), or some combination thereof. In at least one embodiment, one or more components of system 900 are interconnected using compute express link ("CXL") interconnects. In an embodiment, the transceiver 926 can include processing circuitry as described with reference to FIGS. 1-4. In such embodiments, the processing circuitry can facilitate a method for providing a multi-tile system, as described herein.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media, and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "receiving," "providing," "obtaining," "using," or like, refer to action and/or processes of a computer or computing system, or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
an array of functional units connected via a mesh network;
a first functional unit in the array of function units comprising:
a memory device; and
a processing device, operatively coupled with the memory device, to perform operations comprising:
transmitting, over the mesh network to a second functional unit in the array of functional units, a message comprising a node identifier of a target functional unit; and
loading configuration registers of the second functional unit with the node identifier of the target functional unit responsive to receiving the message, wherein the node identifier comprises a first coordinate identifier and a second coordinate identifier identifying a location of the target functional unit in the array of functional units.

2. The system of claim 1, wherein the array of functional units comprises at least one of a processor, a memory controller, a graphics processor, a last level cache tile, a public key accelerator, a regular expression tile, a management gateway, a peripheral component interconnect express (PCIE) request node, or a memory subsystem.

3. The system of claim 1, wherein the node identifier further comprises a mesh interface component and a port identifier.

4. The system of claim 3, wherein the node identifier further comprises one or more information elements selected from the group consisting of a payload, a target type identifier, an information type identifier, a linear identifier, and a protocol identifier.

5. The system of claim 1, wherein the operations further comprise:
determining, from the memory device, product information and revision information associated with the array of functional units, wherein the product information and revision information are stored in a data structure.

6. The system of claim 5, wherein the data structure comprises computer-executable instructions to program the second functional unit based on a target type identifier of the second functional unit.

7. The system of claim 1, wherein the first functional unit further comprises one or more protocol translation adapters (PTAs), and wherein the operations further comprise:
receiving, by the one or more PTAs, configuration information to configure the one or more PTAs to direct one or more messages; and
transmitting the configuration information and the one or more messages to the second functional unit over the mesh network.

8. The system of claim 1, wherein the mesh network comprises a two-dimensional compute subsystem (CSS) interface, and wherein the first coordinate identifier is an x-coordinate of the target functional unit and the second coordinate identifier is a y-coordinate of the target functional unit.

9. A method comprising:
generating, by a first functional unit in an array of functional units connected via a mesh network, a message comprising a node identifier identifying a target functional unit in the array of functional units;
transmitting, over the mesh network the message to a second functional unit in the array of functional units; and
loading configuration registers of the second functional unit with the node identifier of the target functional unit responsive to receiving the message, wherein the node identifier comprises a first coordinate identifier and a second coordinate identifier identifying a location of the target functional unit in the array of functional units.

10. The method of claim 9, wherein the array of functional units comprises at least one of a processor, a memory controller, a graphics processor, a last level cache tile, a public key accelerator, a regular expression tile, a management gateway, a peripheral component interconnect express (PCIE) request node, or a memory subsystem.

11. The method of claim 9, wherein the node identifier further comprises a mesh interface component and a port identifier.

12. The method of claim 11, wherein the node identifier further comprises one or more information elements selected from the group consisting of a payload, a target type identifier, an information type identifier, a linear identifier, and a protocol identifier.

13. The method of claim 9, further comprising:
determining, from a data structure of the first functional unit, product information and revision information associated with the array of functional units.

14. The method of claim 13, wherein the data structure comprises computer-executable instructions to program the second functional unit based on a target type identifier of the second functional unit.

15. The method of claim 9, further comprising:
receiving, by one or more protocol translation adapters (PTAs) in the first functional unit, traffic information to configure the one or more PTAs, to direct one or more messages; and
transmitting, by the first functional unit, the configuration information and the one or more messages to the second functional unit over the mesh network.

16. The method of claim 9, wherein the mesh network comprises a two-dimensional compute subsystem (CSS) interface, and wherein the first coordinate identifier is an x-coordinate of the target functional unit and the second coordinate identifier is a y-coordinate of the target functional unit.

17. A non-transitory computer-readable storage medium comprising instructions that, when executed by a processing device, cause the processing device to perform operations comprising:
generating a message comprising a node identifier identifying a target functional unit in an array of functional units;
transmitting the message over a mesh network to a functional unit in the array of functional units; and
loading configuration registers of the functional unit with the node identifier of the target functional unit responsive to receiving the message, wherein the node identifier comprises a first coordinate identifier and a second coordinate identifier identifying a location of the target functional unit in the array of functional units.

18. The non-transitory computer-readable storage medium of claim 17, wherein the array of functional units comprises at least one of a processor, a memory controller, a graphics processor, a last level cache tile, a public key accelerator, a regular expression tile, a management gateway, a peripheral component interconnect express (PCIE) request node, or a memory subsystem.

19. The non-transitory computer-readable storage medium of claim 17, wherein the node identifier further comprises a mesh interface component and a port identifier.

20. The non-transitory computer-readable storage medium of claim 19, wherein the node identifier further comprises one or more information elements selected from the group consisting of a payload, a target type identifier, an information type identifier, a linear identifier, and a protocol identifier.

21. The non-transitory computer-readable storage medium of claim 17, wherein the operations further comprise:
determining, from a data structure coupled to the array of functional units, product information and revision information associated with the array of functional units.

22. The non-transitory computer-readable storage medium of claim 21, wherein the data structure comprises computer-executable instructions to program the functional unit based on a target type identifier of the functional unit.

23. The non-transitory computer-readable storage medium of claim 17, wherein the operations further comprise:
receiving configuration information to configure one or more protocol translation adapters (PTAs), wherein the configuration information further comprises traffic information to direct one or more messages; and
transmitting the configuration information and the one or more messages to the functional unit over the mesh network.

24. The non-transitory computer-readable storage medium of claim 17, wherein the mesh network comprises a two-dimensional compute subsystem (CSS) interface, and wherein the first coordinate identifier is an x-coordinate of the target functional unit and the second coordinate identifier is a y-coordinate of the target functional unit.

* * * * *